United States Patent [19]

Parkinson

[11] Patent Number: 5,514,952
[45] Date of Patent: May 7, 1996

[54] MONITORING APPARATUS FOR ROTATING EQUIPMENT DYNAMICS FOR SLOW CHECKING OF ALIGNMENT USING PLURAL ANGLED ELEMENTS

[75] Inventor: James R. Parkinson, Vergennes, Vt.

[73] Assignee: Simmonds Precision Products Inc., Akron, Ohio

[21] Appl. No.: 271,215

[22] Filed: Jul. 5, 1994

Related U.S. Application Data

[63] Continuation-in-part of Ser. No. 85,860, Jun. 30, 1993.

[51] Int. Cl.$^6$ .............................. G01B 7/30; G01B 7/14; G01D 21/02
[52] U.S. Cl. .............................. 324/207.25; 324/207.24; 33/661
[58] Field of Search .................. 324/207.22, 207.24, 324/207.25, 207.15, 207.16, 207.23, 209, 243, 175; 73/862.325, 862.331; 356/399, 400, 401; 250/231.13, 231.14, 231.15, 231.16, 231.17, 231.18; 33/661; 340/870.31

[56] References Cited

U.S. PATENT DOCUMENTS

| | | | |
|---|---|---|---|
| 3,190,125 | 6/1965 | Holz | 73/432 |
| 3,307,164 | 2/1967 | Zimmer | 340/195 |
| 3,538,762 | 11/1970 | Parkinson et al. | 73/136 |
| 3,548,649 | 12/1970 | Parkinson | 73/136 |
| 3,641,535 | 2/1972 | Knopf | 340/195 |
| 3,827,807 | 8/1974 | Fletcher et al. | 356/141 |
| 3,863,235 | 1/1975 | McKee et al. | 340/195 |
| 3,876,326 | 4/1975 | Weitz | 415/17 |
| 4,033,042 | 7/1977 | Bently | 33/181 R |
| 4,199,718 | 4/1980 | Ikeda et al. | 324/158 MG |
| 4,488,443 | 12/1984 | Parkinson | 73/862.33 |
| 4,518,917 | 5/1985 | Oates et al. | 324/207 |
| 4,590,806 | 5/1986 | Lutton et al. | 73/862.34 |
| 4,627,724 | 12/1986 | Cameron | 356/141 |
| 4,630,033 | 12/1986 | Baker | 340/347 P |
| 4,737,709 | 4/1988 | Loftus | 324/208 |
| 4,746,859 | 5/1988 | Malik | 324/208 |
| 4,764,767 | 8/1988 | Ishikawa et al. | 340/870.31 |
| 4,810,965 | 3/1989 | Fujiwara et al. | 324/208 |
| 4,833,405 | 5/1989 | Richards et al. | 324/208 |
| 4,899,596 | 2/1990 | Janik et al. | 73/862.33 |
| 4,924,180 | 5/1990 | Nasr et al. | 324/207.15 |
| 5,086,272 | 2/1992 | Hinrichsen | 324/207.13 |
| 5,182,953 | 2/1993 | Ellinger et al. | 73/862.335 |
| 5,192,862 | 3/1993 | Rudd, III | 250/227.21 |
| 5,228,349 | 7/1993 | Gee et al. | 73/862.336 |
| 5,313,845 | 5/1994 | Hayashi et al. | 73/862.334 |

FOREIGN PATENT DOCUMENTS

| | | |
|---|---|---|
| 0287214A2 | 10/1988 | European Pat. Off. . |
| 0443514A3 | 8/1991 | European Pat. Off. . |
| 231633A1 | 12/1983 | Germany . |
| 2637960 | 3/1984 | Germany . |
| 3311945C2 | 4/1986 | Germany . |
| 3908248A | 5/1988 | Germany . |
| 58-111719 | 7/1983 | Japan . |
| 59-13906 | 1/1984 | Japan . |
| 62-420009 | 2/1987 | Japan . |
| 62-44603 | 2/1988 | Japan . |
| 1391713 | 8/1972 | United Kingdom . |
| 2062875 | 5/1981 | United Kingdom . |
| 2079467 | 1/1982 | United Kingdom . |
| 2105475 | 3/1983 | United Kingdom . |
| 2181246 | 4/1987 | United Kingdom . |
| 2221306 | 1/1990 | United Kingdom ............. 324/207.24 |

OTHER PUBLICATIONS

Welsh *An angular displacement transducer,* J. Phys. E; Sci. Instrum., vol. 13, 1980, pp. 826–828.
Derwent Abstract for Societ Union Patent No. 1,023, 194–A.

Primary Examiner—Sandra L. O'Shea
Assistant Examiner—Roger Phillips
Attorney, Agent, or Firm—Leonard L. Lewis; Richard A. Romanchik

[57] ABSTRACT

Axial alignment detection apparatus for a shaft rotatable about an axis includes alignment indicating means rotatable by the shaft and comprising a plurality of detectable elements; and detector means for detecting the elements and alignment of the shaft as a function of the elements; the elements comprising at least one reference element and at least one alignment dependent element, wherein the reference and alignment elements have a detectable alignment dependent relationship to each other.

11 Claims, 7 Drawing Sheets

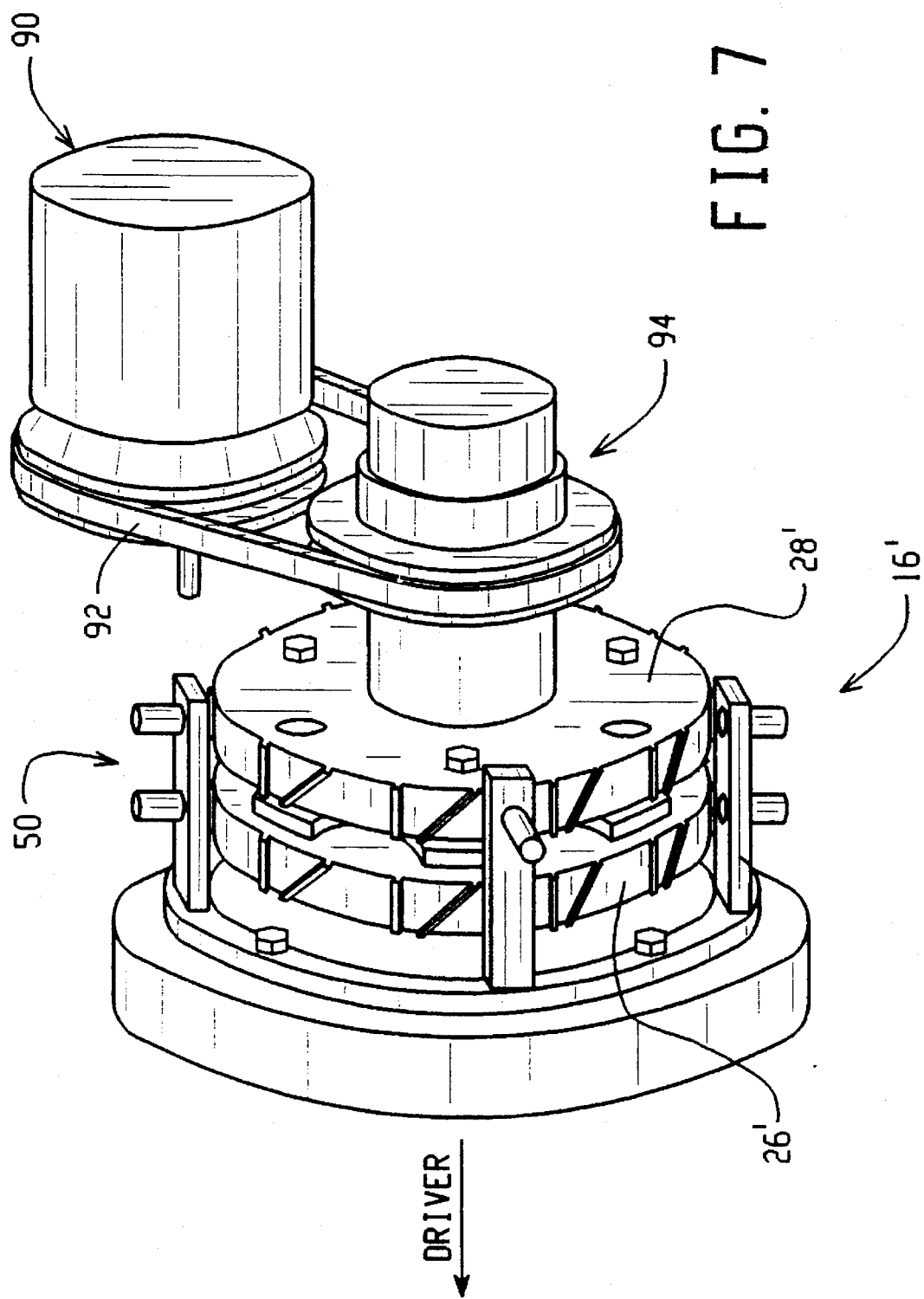

MONITORING APPARATUS FOR ROTATING EQUIPMENT DYNAMICS FOR SLOW CHECKING OF ALIGNMENT USING PLURAL ANGLED ELEMENTS

This application is a continuation-in-part of U.S. patent application Ser. No. 08/085,860 filed on Jun. 30, 1993 for "MONITORING APPARATUS FOR ROTATING EQUIPMENT DYNAMICS", owned in common by the assignee of the present invention.

BACKGROUND OF THE INVENTION

The invention relates generally to position and alignment detection apparatus and methods for rotatable equipment. More particularly, the invention relates to axial displacement and alignment detection apparatus and methods for rotatable shafts, especially during set-up and initial alignment procedures.

As is well known, in most rotatable equipment applications in which there is a coupling between two rotatable elements, axial alignment and displacement are important factors that can affect the life of the equipment and operating efficiency of the system. Ideally, of course, coupled rotatable elements such as shafts, for example, are aligned collinearly on a common axis of rotation to minimize the forces applied to the shafts, couplings and load bearings. However, near perfect and constant alignment is difficult if not impossible to achieve in actual day to day operation of such equipment. A certain amount of axial displacement or float is usually designed into a system, and flexible couplings between shafts are commonly used to compensate for shaft misalignment. Shaft misalignment can be caused by numerous factors such as human error when assembling the system components, bearing wear, thermally induced expansion and contraction of the shaft and bearing assemblies, load variations, settling of foundations that support heavy machinery, and so on to name just a few.

Shaft misalignment can be generally categorized into three types: 1) axial displacement in which a shaft is displaced in a direction parallel to the shaft axis of rotation; 2) angular displacement or skewing in which a shaft is not parallel with a desired axis of rotation, or in which two coupled shafts have nonparallel axes of rotation; and 3) parallel or offset displacement in which two shafts have axes of rotation that are not collinear even if they are parallel. Of course, these three general types of axial misalignments can occur in various combinations or all together. Furthermore, two coupled shafts may exhibit relative axial displacement between the shafts.

As an example, a gas turbine engine may be used to turn a drive shaft that is flexibly coupled to a driven shaft that in turn is coupled to a load such as a generator. A coupling shaft may be interposed between the drive shaft and the driven shaft. Misalignment of the shafts can cause excessive wear of the bearings, can apply excessive loads and torque to the shafts, and generally will decrease the operating efficiency of the system.

Although various mechanical features such as flexible couplings can be used to compensate for shaft misalignment, it is desirable that the shaft positions be monitored or else the couplings can be damaged.

Axial displacement of a shaft is relatively easy to detect. For example, U.S. Pat. No. 4,833,405 issued to Richards et al. shows a dual sensor arrangement for detecting teeth axially spaced on a rotating shaft. Phase differences between the sensor signals can be used to indicate axial displacement. However, this arrangement is susceptible to false readings caused by angular and/or offset displacement. As a result, the arrangement is unsuitable for systems in which shaft misalignment other than simple axial displacement occurs; and is particularly unsuitable for systems that utilize coupled shafts. This arrangement also depends on accurate and fixed positioning of the sensors relative to the shaft sensible elements. The need for two sensors also increases the cost of the overall apparatus, and is further hampered by the need to arrange the sensors in such a manner as to prevent mutual inductance between the sensors.

Angular and offset misalignments are more difficult to detect due to the lack of an easily identified reference alignment. Consequently, shaft angular and offset alignment detectors commonly use variations in magnetic coupling strength caused by distance variations between two magnetically or inductively coupled elements. This general approach, however, is susceptible to noise because the alignment information is amplitude encoded in the detector signals. Furthermore, these apparatus can produce false readings due to axial displacement of one or more of the shafts.

The objectives exist, therefore, for position and alignment detection apparatus and methods that are simpler and less costly than known arrangements, and which can detect angular, offset and/or axial displacement each independent of the other types of misalignment (or compensated therefore), and which can detect relative displacement between two coupled shafts. Such apparatus and methods should also be usable in combination with a calibration and set-up procedure to align shafts in a system.

SUMMARY OF THE INVENTION

To the accomplishment of the foregoing objectives and the aforementioned needs and shortcomings of known shaft position and alignment detection devices, the present invention contemplates, in one embodiment, apparatus for determining set-up alignment of an axially rotatable shaft, comprising: at least two detectable elements coupled to the shaft for rotation therewith and having a shaft alignment dependent relationship to each other; a sensor for detecting the elements as they rotate past the sensor; the sensor producing an output that represents the shaft alignment as the shaft is rotated slowly.

The invention also contemplates the methods embodied in the use of such apparatus, as well as a method for determining set-up alignment of a rotatable shaft, comprising the steps of:

a. slowly rotating at least two detectable elements with the shaft about the shaft rotational axis;

b. optically detecting position of the elements with respect to each other to determine shaft alignment using an optical detector; and c. using the optical detector to determine shaft alignment during operational rotation of the shaft.

These and other aspects and advantages of the present invention will be readily understood and appreciated by those skilled in the art from the following detailed description of the preferred embodiments with the best mode contemplated for practicing the invention in view of the accompanying drawings.

BRIEF DESCRIPTION OF THE DRAWINGS

FIG. 7 illustrates in perspective an application of the invention for calibration and set-up of a rotatable system using a calibration replica of a coupling used in normal operation.

DETAILED DESCRIPTION OF THE INVENTION

Figure 1:
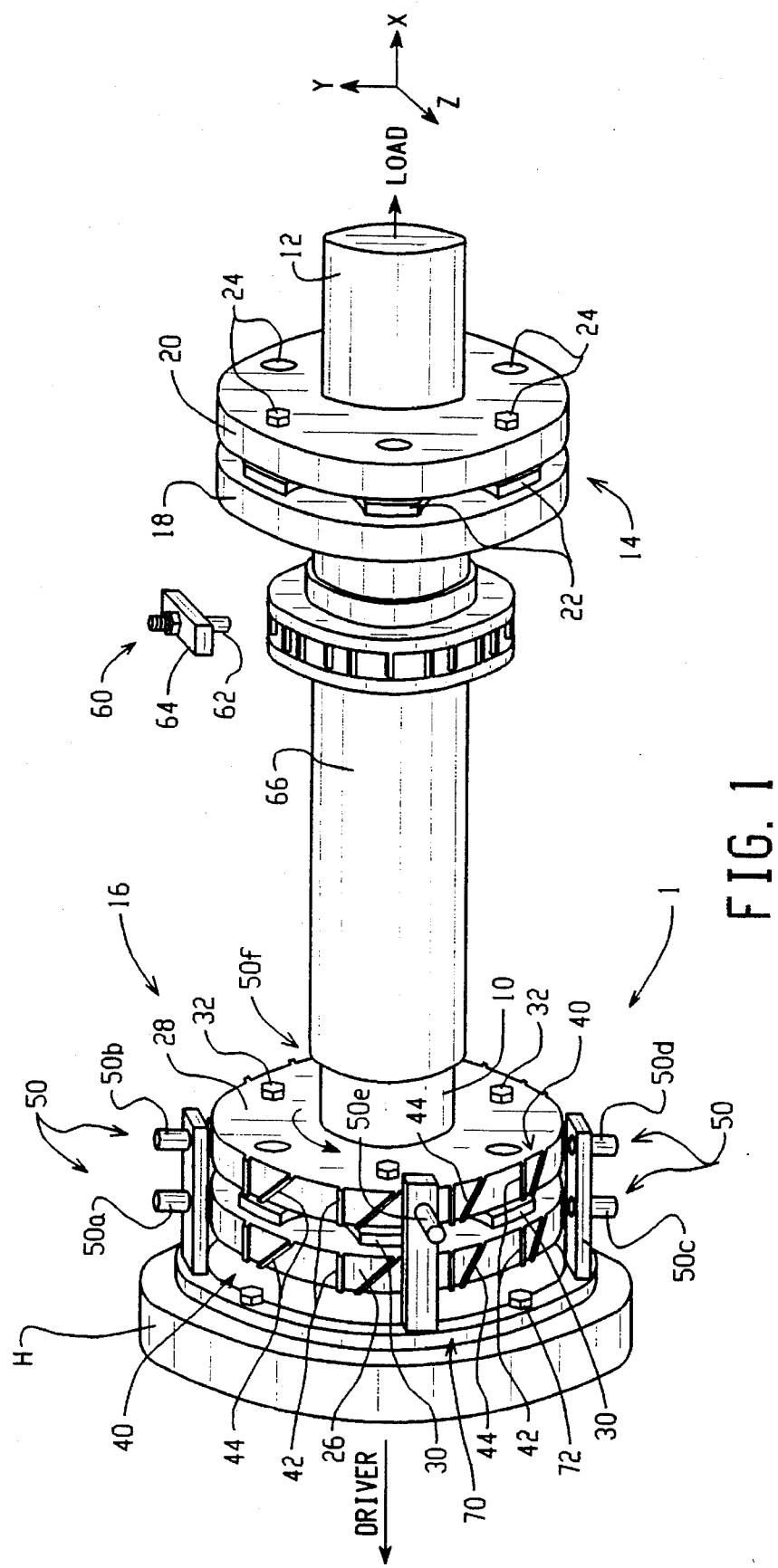
FIG. 1 is a schematic perspective of a rotatable shaft position and alignment detection apparatus illustrated in an exemplary manner for use with coupled shafts.

With reference to FIG. 1, there is illustrated in a simplified exemplary manner a shaft position and alignment detection apparatus 1 according to the present invention. In the example illustrated schematically in FIG. 1, different aspects and embodiments of the invention are incorporated into an overall monitoring system for various dynamic properties of rotatable equipment. Those skilled in the art will readily appreciate that the invention contemplates not only the integration of all these features into a total sensor system as shown in FIG. 1, but also the use of various individual subparts in any number of combinations as is convenient depending on the particular application. Therefore, the description herein of the overall system and specific use should not be construed in a limiting sense as to the various and numerous improvements and advantages of the invention.

In addition, although the invention is described herein with respect to specific examples of rotatable shaft alignment detection apparatus and procedures, and particularly for coupled shafts and engine driven shafts, these examples are merely for convenience and ease of understanding and are not intended to embody any specific limitation as to the scope and use of the invention. The various features of the invention have application to a wide range of rotatable equipment applications and shaft alignment situations, whether with respect to a single shaft or two or more coupled shafts, and regardless of the type of mechanism used to turn the shafts or the loads driven by the shafts. The particular mechanisms used to couple shafts as described herein are also a matter a design choice and form no particular aspect or limitation of the invention.

In FIG. 1 then, a drive shaft 10 is coupled to a driven shaft 12 by a suitable coupling assembly 14. The driven shaft 12, of course, can be coupled to another shaft or to a load device such as a generator, for example (not shown.) The drive shaft is coupled to an engine power plant such as a gas turbine engine or other suitable means to turn the shaft as desired (not shown.) The power plant typically includes a housing H with an end plate or other suitably rigid structure that can support sensors used with the invention. The sensors do not have to be mounted to the power plant, however, a separate structure could be provided to support the sensors about the shafts.

The drive shaft 10 is coupled to the power plant by a second coupling assembly 16, which can conveniently but not necessarily be similar in construction to the first coupling assembly 14. In this embodiment, the coupling assemblies 14,16 are flexible disk couplings which include a plurality of disks sandwiched between two hub assemblies. For example, the first coupling assembly 14 includes first and second hubs 18,20 and a plurality of flexible disks 22 which are axially stacked. The disks couple the shafts together so as to transmit torque from the drive shaft to the driven shaft, while at the same time permitting relative movement between the coupled shafts 10,12 both axially and nonaxially to compensate for shaft misalignments. The hubs 18,20 are secured together by a plurality of bolts 24. Half of the bolts 24 secure the disk stack to one hub and the other half of the bolts secure the disk stack to the other hub.

The second coupling 16 can be similarly constructed as the first coupling. Hence, the second coupling 16 includes first and second hubs 26 and 28 with stacked plates 30 sandwiched therebetween with the coupling assembly held together by bolts 32. The first hub 26, of course, is mounted to the engine drive with torque transmitted to the drive shaft 10 via the plates 30 and second hub 28.

Each hub of the second coupling 16 is provided with a plurality of teeth or sensible elements 40. These teeth are preferably made of a ferromagnetic material such as, for example, AISI 4340 or AMS 6260. The teeth 40 include a plurality of reference teeth 42 which in the exemplary embodiment of the drawings herein are aligned generally parallel with the rotational axis of the shafts 10,12. The teeth 40 also include a plurality of position dependent alignment teeth 44. Those skilled in the art will readily appreciate, however, that the reference teeth can be oriented in any suitable manner, and in fact the term "reference teeth" is simply used for ease of explanation and clarity. Either set of teeth can be considered the "reference" for purposes of the invention. More generally, the invention contemplates that the teeth have a position dependent relationship that can be detected as the shafts rotate. It will also be noted that in the exemplary embodiment described herein, the teeth 40 are equally spaced about the entire circumferential perimeter of the hubs. However, this is primarily done to simplify the electronics required for sensing the teeth and to improve the accuracy of the apparatus. Depending on the particular application of the invention, the number of teeth used and their position about the hubs is largely a matter of design choice.

A particular advantage of the embodiment described in this case, however, is that the reference teeth and the position dependent teeth commonly mounted on a single hub (such as hub 28 for example) can be detected by a single sensor as the hub turns with its associated shaft.

The shaft position and alignment detection apparatus 1 includes the teeth 40 and a plurality of sensors 50 selectively positioned about the periphery of the hubs so as to detect the teeth 40 as the teeth rotate with their associated hub and shaft. In the exemplary embodiment of FIG. 1, there are two sensors 50a and 50b disposed at the top of the shaft assembly with the first sensor 50a aligned to detect the teeth on the first hub 26. The second sensor 50b is aligned to detect the teeth on the second hub 28. Diametrically opposite these two sensors are two additional sensors 50c and 50d. The third sensor 50c detects the same teeth as the sensor 50a, and the fourth sensor 50d detects the same teeth as the sensor 50b. Preferably, these four sensors 50a–d all lie in a common plane that is generally vertical (such as the XY plane for example), although this orientation is not required for use of the invention. The vertical alignment is useful for detecting shaft misalignment out of the horizontal (for example, the XZ plane) plane of the shafts. As an example, the second and fourth sensors 50b and 50d can be used to detect angular misalignment of the drive shaft 10 with respect to the engine drive. Such angular misalignment could be manifested for example due to an angular displacement or rotation of the drive shaft 10 in the XY plane such that the axis of rotation of the drive shaft is no longer horizontal.

It is important to keep in mind that the description herein of rotational displacements and misalignments as well as reference alignments are simply examples and are not to be construed in a limiting sense. An important aspect of the invention is that shaft axial position and misalignment (whether angular or offset) can be detected with respect to any reference position and direction that the designer may choose. Also, the use of the teeth on the coupling and specifically the hubs is but one example of where the teeth and sensors can be disposed. The teeth can be disposed for example directly on the shaft or a shaft sleeve if desired.

Only two sensors (such as sensors 50a and 50c or 50b and 50d) are needed to detect shaft misalignment in a plane that is transverse to the plane that the sensors lie in. The reason that four sensors are shown in the vertical plane for FIG. 1 is that sensors 50a and 50b can be used together to detect relative axial displacement between the two hubs 26 and 28, as will be more fully described hereinafter. Sensors 50c and 50d can also be used for the same purpose. All four sensors can be used for detecting relative axial displacement in such a manner that the displacement information is independent of shaft misalignment. Again, the number of sensors used and their position and use will depend on what alignment and displacement information is to be extracted from use of the apparatus of the invention.

As shown in FIG. 1, the sensors 50 also include a pair of horizontally and diametrically disposed sensors 50e and 50f (note that in FIG. 1 the sensor 50f is not in view.) These sensors can be used to detect angular misalignment out of the vertical XY plane.

Each of the sensors 50 is preferably of the type that produces an output signal that corresponds to detection of the teeth as they rotate past the sensor. For example, the sensors 50 may be monopole variable reluctance sensors that produce an electrical output signal that is a function of flux variation in the sensor induced by using ferromagnetic material for the teeth 40. Such monopole sensors are well known and described in U.S. Pat. Nos. 4,488,443; 3,876,326 issued to Parkinson; Weitz respectively, which patents are commonly owned by the assignee of the present invention and the entire disclosures of which are fully incorporated herein by reference. Of course, many different types of sensors can be used. For example, magneto-optic sensors can be such as described in U.S. Pat. No. 5,192,862 issued to Rudd and commonly owned by the assignee of the present invention, the entire disclosure of which is fully incorporated herein by reference. Alternatively, optical sensors could be used with optically reflective material on the teeth. These are but a few of the many types of sensors and teeth that can conveniently be used with the invention.

Although not shown in FIG. 1, the sensors 50 are connected to an electronic circuit that processes the sensor output signals to determine the desired information relating to axial misalignment and displacement.

Also shown in FIG. 1 is a monopole torque sensing assembly 60. This torque sensing assembly may be of the type shown and described in U.S. Pat. Nos. 3,548,649 and 5,182,953 issued to Parkinson and Ellinger et al. respectively, or in U.S. Pat. No. 5,228,349, which are commonly owned by the assignee of the present invention, the entire disclosures of which are fully incorporated herein by reference. A detailed description of the operation of the torque sensing assembly 60 is provided in the incorporated disclosures and thus need not be repeated herein. It should be noted, however, that the torque sensor assembly 60 conveniently can be configured with a sensor 62 that is the same in construction as the sensors 50. Of course, any one or more of the sensors 50,62 can be different in design from the other sensors if so desired for a specific application. The sensor 62 can be mounted to a supporting structure (not shown) with a bracket 64 or other suitable means. As explained in the referenced disclosures, the torque sensing assembly 60 includes a reference sleeve rigidly attached to one end of the shaft whose torque is being detected, to provide a reference point for the torque sensor. A temperature sensor (not shown) can also be provided to detect the shaft temperature for compensating the torque readings because shaft deflection varies in relation to the temperature of a shaft under torsional stress.

Figure 2:
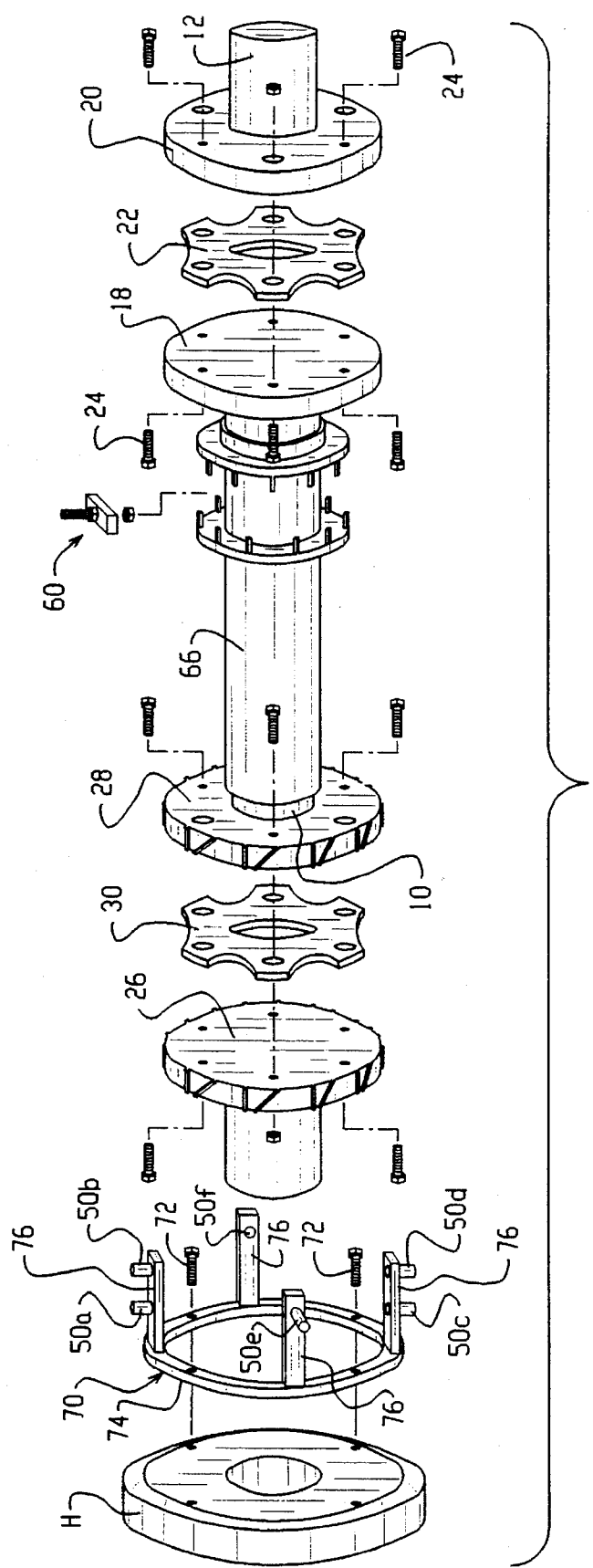
FIG. 2 is an exploded view of the exemplary arrangement shown in FIG. 1.

With reference to FIG. 2, the sensors 50 can conveniently be mounted on a bracket assembly 70 that is attachable to the power plant frame housing H by any suitable means such as bolts 72. The bracket assembly 70 includes a frame 74 and a plurality of axial extensions 76 that are suitably positioned such that when the assembly 70 is mounted on the housing, the sensors 50 are positioned in such a manner as to detect the corresponding teeth 40 that rotate past the sensors.

As illustrated in FIGS. 1 and 2, the reference and position dependent teeth 40 have a predetermined relationship with respect to the rotation axis of the shafts such that displacement or misalignment of the shafts due to axial displacement, skewing or offset can be detected by the sensors 50. Rotational speed information is also detectable. The various sensors 50 operate to detect the teeth 40 in the same basic manner with preferably similar output signal parameters, thus simplifying the signal processing requirements. Therefore, a general description of the sensor/teeth detection approach follows next, then a more detailed description of how the sensors can be arranged and operated to obtain the desired dynamic characteristics of the rotating members will be presented herein.

Figure 3A:
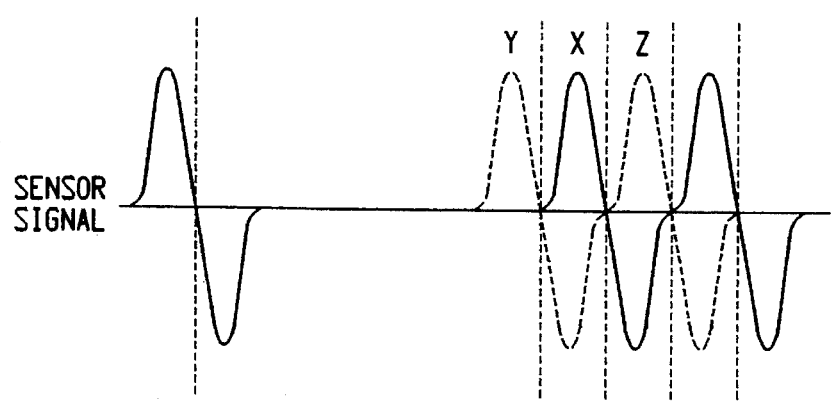
FIGS. 3A, 3B and 3C is a simplified illustration of suitable teeth arrangements for the detection apparatus of FIG. 1, and also showing typical signals that can be produced by sensors detecting the teeth.

With reference to FIG. 3, we show in a simplified manner a suitable tooth arrangement in which, for example, the reference teeth 42 are generally aligned with the rotational axis of its associated shaft, and the alignment teeth 44 are positioned at an angle with respect to the reference teeth. Preferably, but not necessarily, the teeth 42,44 are spaced around the periphery of the hub to which they are attached. The alignment teeth also preferably do not extend more than half of the distance between successive reference teeth. This arrangement simplifies the signal processing but is not essential for realizing the benefits of the present invention.

Figure 3B:
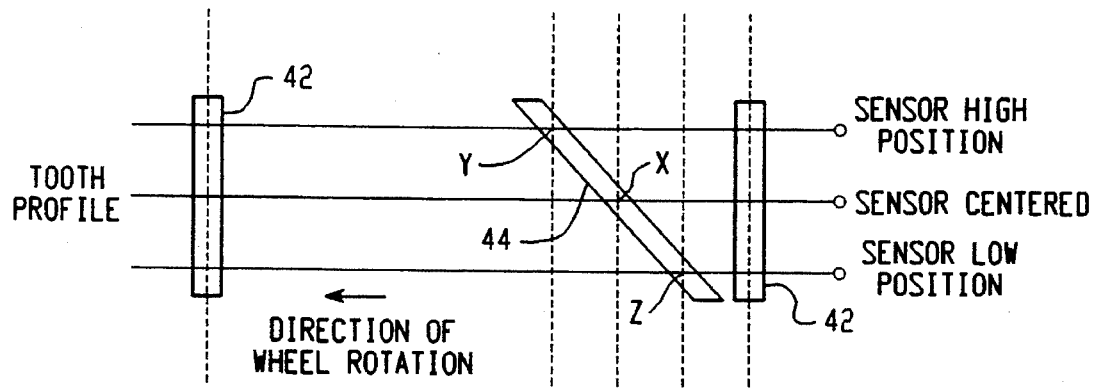
Figure 3C:
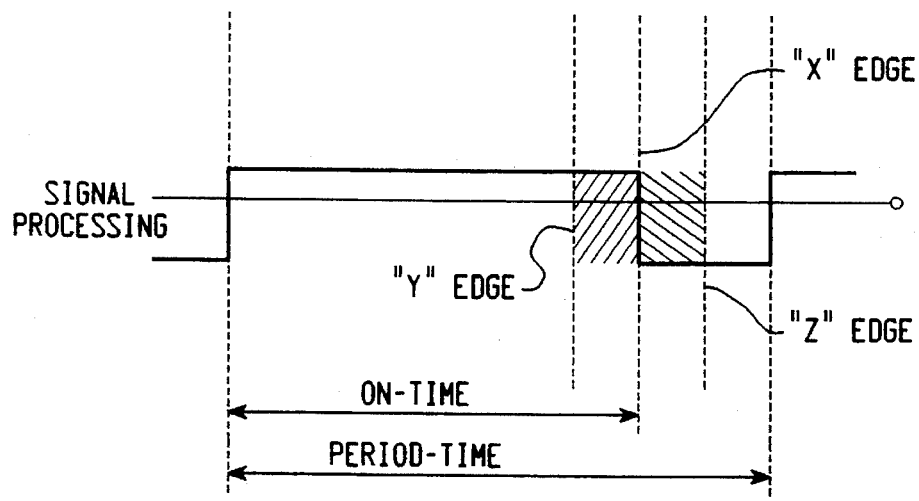

In FIG. 3B, there is shown two reference teeth 42 and an alignment tooth 44. In this drawing, the direction of hub rotation is in a horizontal direction. Assume now that the teeth are made of a ferromagnetic material and that a monopole sensor 50 is disposed so as to be centered (as at X) between the axial ends of the teeth 40 (which in FIG. 3B would be the top and bottom of the teeth.) In such a case, a monopole variable reluctance sensor produces a generally sinusoidal signal as it detects the passing reference and alignment teeth. The sensor output signal goes through a zero as each tooth center passes by the sensor. By using a zero crossing detector in the signal processing circuitry (FIG. 3C), the sensor output signal can be conveniently converted to a digital type signal that has an "on/off" or "high/low" ratio that is a function of the position of the sensor with respect to the teeth 40. For example, of the sensor is not centered, but rather is positioned near the top (as at Y) of the teeth in FIG. 3B, then the on/off ratio will change compared to the ratio when the sensor is centered with respect to the teeth. The ratio also changes if the sensor is positioned near the bottom (as at Z) of the teeth in FIG. 3B. Note that in this example, the on/off ratio is a ratio of the time period from a reference tooth to the alignment tooth, divided by the total time period between two successive reference teeth. Thus, a simple sequential pulse ratiometric detection of the on/off ratio corresponds to the change in position of the sensor with respect to a reference position of the sensor. The reference position of the sensor of course can easily be determined by the initial sensor output signal, or can be set to a specific value during calibration. As also shown in FIG. 3C, the digital signal can further be processed by converting it to a DC voltage that corresponds to the time period ratio information. Of course, those skilled in the art will recognize that many different signal processing schemes can be used for determining the sensor position variation as a function of the spacing between the teeth, particularly depending on the degree of accuracy desired and the type of sensor output signal that is produced.

Figure 4:
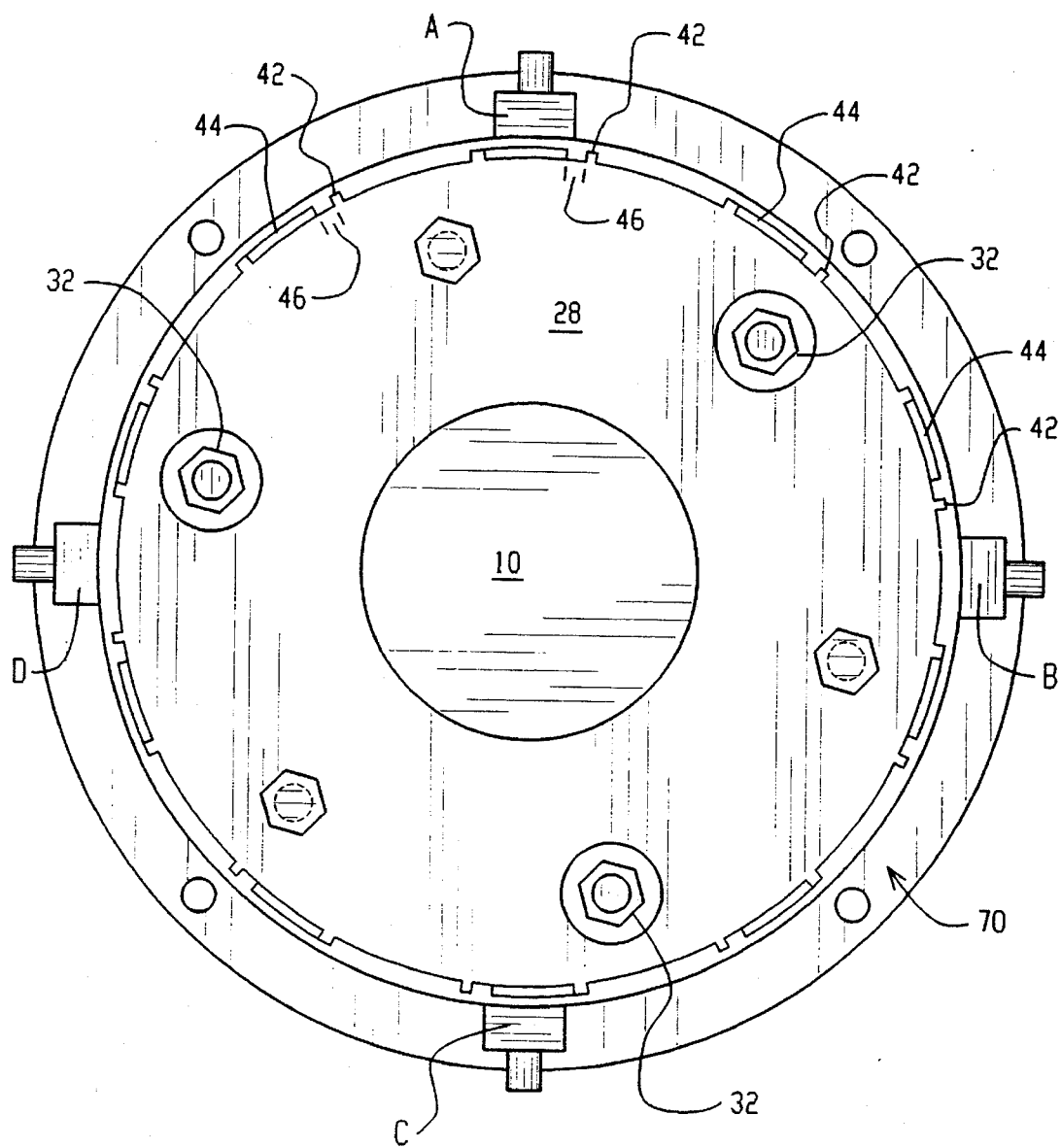
FIG. 4 is an end view in elevation of one of the hubs showing the teeth and sensor arrangements in one embodiment of the invention.

It can be noted at this time, that any of the sensors used in the apparatus of FIG. 1 can be used to detect the rotational speed of the corresponding shaft, because the total period time between reference teeth zero crossing points (FIG. 3A and 3C) corresponds directly to the rotational speed. Furthermore, the signals produced by the sensors, for example variable reluctance sensors, can be used to develop power supply voltage and current if desired With reference next to FIG. 4, in the example embodiment described herein, there are four sensors A, B, C, and D arranged in quadrature about the hub periphery in sufficiently close proximity to the teeth 40 that the teeth can be detected as they rotate past the sensors. Each sensor has output conductors or other suitable means, of course, to connect or couple the sensors to a signal processing circuit, as will be described shortly. As shown in FIG. 4, sensors A and C are disposed in a vertical plane (in a manner similar to sensors 50b and 50d in FIG. 1), while sensors B and D are disposed generally in a horizontal plane (in a manner similar to sensors 50e and 50f in FIG. 1.) Note again that the alignment teeth 44 are disposed within half of the distance between successive reference teeth 42, although as previously noted the invention can be implemented in other tooth configurations. Further note that each alignment tooth end that is proximate a reference tooth is spaced from the reference tooth by a gap 46. This gap helps assure that the reference signals can be discriminated from the position dependent signals by the signal processing circuitry.

With further reference to FIGS. 3 and 4, it will be noted that each sensor A, B, C and D can be used individually to detect axial displacement of the shaft from a reference position. This is because axial displacement causes a corresponding change in the time that it takes for the position dependent tooth to pass by the sensor after a reference tooth passes by the sensor, but the time period for two successive reference teeth to pass by the sensor remains the same (assuming a constant speed of rotation.) By using the sequential pulse time period ratiometric technique described herein, the variable speed of the shaft is automatically factored in to the positional measurements.

Although axial displacement is thus relatively easy to determine, angular or offset alignment changes of the shaft will cause erroneous readings. This arises, of course, from the fact that such axial misalignments also cause corresponding changes in the time periods detected for the position dependent teeth to pass the sensors with respect to the reference teeth periods.

In accordance with an important aspect of the invention, the axial displacement measurements can be compensated for axial misalignments by combining the output signals from two or more of the sensors 50. With reference to FIGS. 1 and 4, it is noted, for example with respect to the horizontally disposed sensors, that an angular (skew) change in the shaft alignment in the XY plane does not change the timing period ratio for the horizontal sensors. However, for the vertically disposed sensors, such a skewing causes equal and opposite changes in the on/off ratio for the two sensors respectively. In other words, a skew in the XY plane will cause one of the sensors to detect the alignment tooth sooner in time compared to the reference position, while the other vertical sensor detects the alignment tooth later in time. This time domain offset that occurs will be equal in magnitude for each sensor but one sensor will detect a positive change and the other a negative change. The significance of this phenomena is that if the corresponding sequential pulse ratios of the two sensor signals are added together, then the combined signal corresponds to axial displacement of the shaft independent of the angular misalignment. Furthermore, if the sequential pulse ratios are subtracted from one another then the combined signal corresponds to the angular displacement information independent of axial displacement effects. This arises from the fact that axial displacement causes two diametrically opposed sensors to detect equal shifts in the on/off ratio that are also equal in direction of the shift (i.e. not equal and opposite shifts but rather equal and in the same direction shifts.)

In a similar manner, when the horizontally disposed sensors 50e and 50f sequential pulse ratios are added together, the combined signal corresponds to axial displacement of the shaft independent of angular misalignment in the XZ plane, and if the sequential pulse ratios are subtracted the combined signal corresponds to the angular misalignment independent of the axial displacement.

In accordance with other important aspects of the invention, it should be noted that the shaft alignment and position information can be determined independent of the amplitude of the signals produced by the sensors in response to the passing teeth. Furthermore, the information can be extracted from each sensor output signal independent of its phase relationship to any other sensor's output signal. In other words, the invention does not depend on the absolute positions of the sensors with respect to each other because the relative phases of the signals is not the parameter of interest, but rather simply the time period ratios with respect to reference values. In fact, two oppositely disposed sensors can be rotationally offset up to nearly a full separation distance between reference teeth without significantly affecting the accuracy of the invention. In contrast, prior techniques that depended on phase relationships between sensor signals are highly sensitive to actual rotational positioning of the sensors with respect to each other and the sensible elements.

Although axial position alignment and compression measurements in this embodiment of the invention do not utilize phase relationships between sensor signals, such information can be extracted for useful purposes: for example, episoidal motion (orbiting) monitoring. With reference to FIG. 4, by using the pulses corresponding to the passage of reference teeth by sensors D and B, a direct measurement of vertical location of shaft 10 is achieved. Reference pulses produced by sensor D are used to drive a multivibrator to the high state and reference pulses from sensor B restore the multivibrator to the low state. With shaft 10 rotating counterclockwise, for example, an upward vertical movement of the shaft 10 (towards sensor A for example) will reduce multivibrator on time ratio while a downward vertical movement of the shaft 10 will increase multivibrator on time ratio. Using sensors A and C, in a like manner, will provide an accurate measurement of shaft 10 horizontal excursion. Absolute location of the shaft 10 can be determined at a frequency equal to the number of reference teeth times RPM.

Although the embodiment described herein is for the use of two sensors to detect angular misalignment out of a plane that is transverse to the plane of the sensors, with four sensors being used in quadrature to detect vertical and horizontal misalignments, the four sensor outputs could be combined vectorially to determine total shaft position and displacement within a predetermined envelope. Furthermore, only three sensors are needed to obtain this information, although the use of four sensors simplifies the signal processing electronics.

With reference again to FIG. 1, the invention also contemplates use of the sensors 50 to detect relative axial displacement between coupled rotatable members, such as the shaft 10 and the engine drive. Note that each of the top sensors 50a and 50b can individually detect axial displacement of its respective rotatable member. If both rotatable members are displaced in the same direction then both sensors will detect an equal positive or negative change (the sign of the change being dependent on the direction of the axial shift) in the time period ratio. However, if there is a relative axial displacement then the sensors will detect different time period ratio changes. This may occur, for example, if there is a compression between the shafts at the coupling 16. Thus, the difference of the output signals corresponds to the relative axial displacement. Also, the relative displacement information can be determined independent of angular and offset misalignments by utilizing the information collected from sensors 50c and 50d (summation of equal and opposite changes caused by such misalignments).

It should be noted that the determination or detection of relative axial displacement in accordance with the invention can be performed between any rotatable elements whether they are coupled together, operating at different rotational speeds or aligned on different rotating axes. This is because the invention provides position information relative to a reference sensor location independent of rotational speed and signal frequency. This is a significant advantage over prior systems that are dependent on relative phase relationships between two or more sensors.

Figure 5:
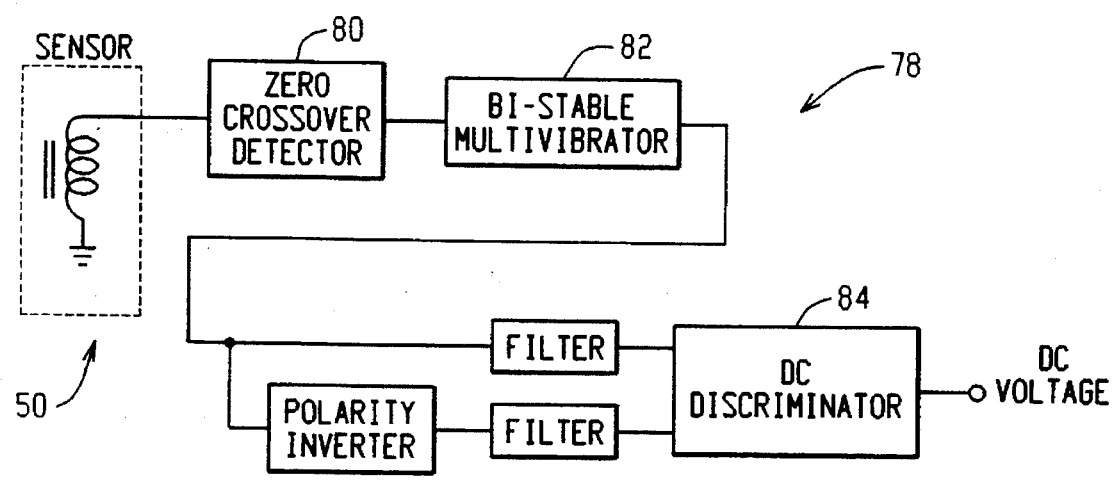
FIG. 5 is an electrical schematic diagram for a sensor output signal processing circuit suitable for use with the present invention in an embodiment that uses variable reluctance sensors.

With reference now to FIG. 5, we show a schematic diagram of a circuit 78 suitable for use with variable reluctance type devices used for the sensors 50. The circuit 78 of FIG. 5, of course, can be the same design for each sensor. The sensor 50 is connected to a zero crossover detector 80 that produces a trigger pulse or other suitable signal that triggers a bi-stable multivibrator 82. In the example described herein, when a reference tooth passes by the sensor the output of the multivibrator 82 is logic high, and when the position dependent tooth passes by the sensor the output of the multivibrator is reset low. This arrangement is of course just exemplary—many different signal processing schemes can be used. The multivibrator 82 output is then filtered and converted to a DC voltage level, using a discriminator 84, that corresponds to the ratio of high to low time periods for the multivibrator output. This DC voltage thus corresponds, as described hereinbefore, to the actual position of the sensor relative to the sensible teeth 40.

Figure 6:
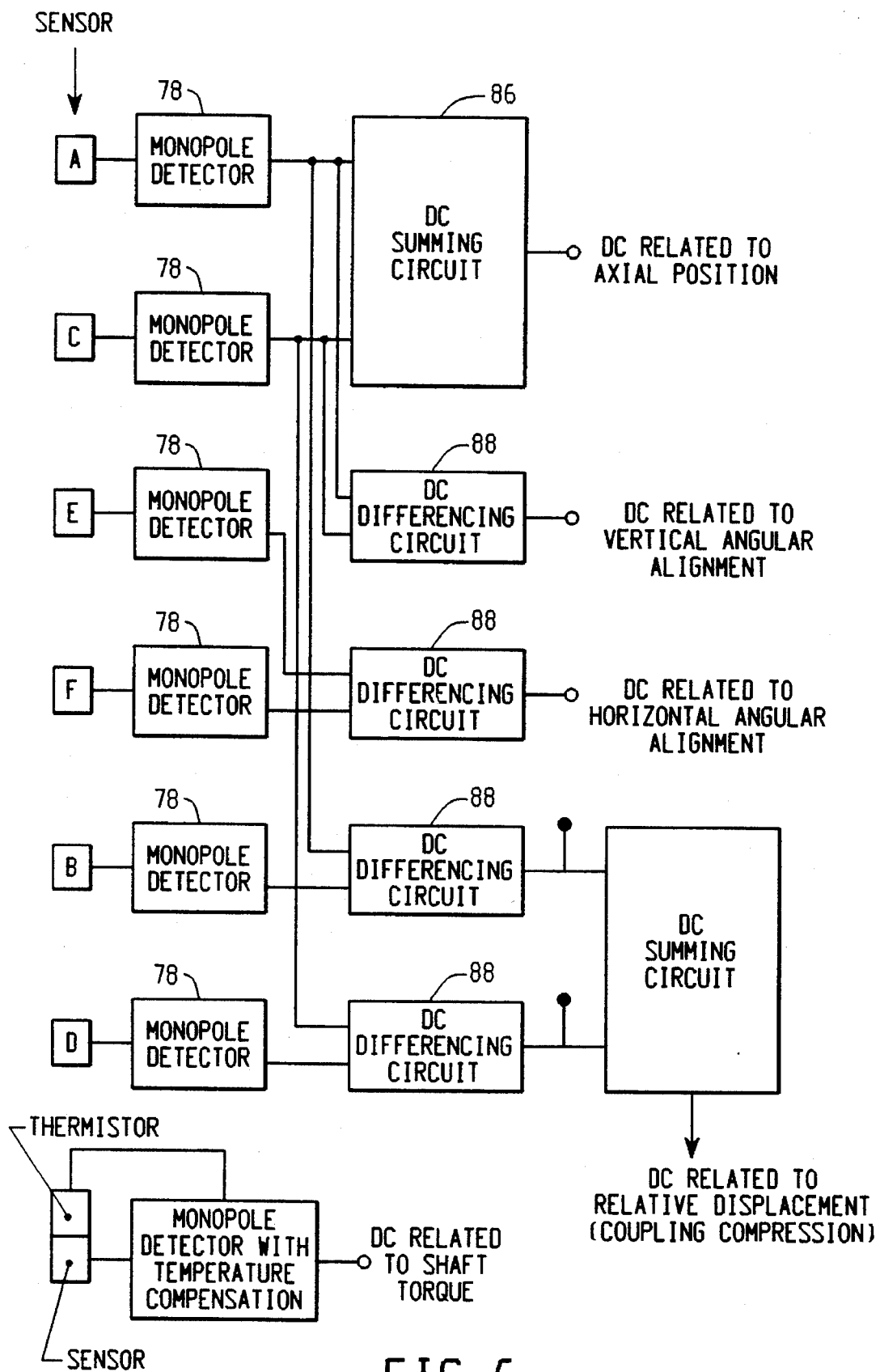
FIG. 6 is an electrical schematic diagram for a signal processing circuit suitable for use with the present invention which combines output signals from several sensors as arranged, for example, in FIG. 1 for determining different dynamic characteristics of a rotatable system.

With reference next to FIG. 6, we show an electrical schematic for a signal processing circuit that combines the output signals of the several sensors illustrated in FIG. 1 to produce signals that correspond to axial displacement and alignment each independent of the other, as well as the compression and torque information if desired. Each of the sensors A–F is connected to a discriminator circuit similar to the circuit 78 shown in FIG. 5. The outputs of these circuits are in turn connected to summing and differencing circuits 86,88 so as to produce the desired information. For example, when the signals that correspond to the sensors 50b and 50d are summed the result is a signal that corresponds to axial displacement independent of the axial alignment. When the same signals are subtracted from each other, the result is a signal that corresponds to the angular alignment independent of the axial displacement. Note that the output signals from the sensors used for detecting the axial compression information (sensors 50a and 50b in FIG. 1) are further combined in order to produce compression related signals that are independent of angular misalignment. As also shown in FIG. 6, temperature compensated torque measurements from the torque sensor 62 can also be included in the signal processing circuit.

With reference next to FIG. 7, a significant advantage of the invention is the inherent capability to perform an alignment procedure that can be used in conjunction with the routine set-up procedure for the equipment being monitored. Rotating equipment such as the engine driver, shafts and load of FIG. 1 typically require a preoperating alignment procedure to set-up the equipment. Shaft alignments are important, of course, for optimizing efficiency and reducing damage and wear of the shafts, bearings and couplings. However, after the equipment is running for a time, temperature and vibration can result in realignment. Therefore, in the field, equipment is typically set-up in such a manner that the effects of temperature in particular cause the equipment to realign during operation hopefully into a properly aligned condition. This set-up alignment however is often done by line of sight or other methods using calculated thermal growth predictions. More importantly, once the operator believes the equipment is aligned, the equipment is usually closed up and run, with no way to determine if in fact the equipment shifted into alignment or is maintaining alignment without having to shut the equipment down. Such steps are very costly and therefore impractical.

As part of the set-up procedure, however, the invention provides a way to determine an optimal alignment condition before the load is connected, then to monitor the alignment during operation of the equipment to verify that in fact the equipment came into proper alignment during operation. This technique can be realized, for example, by connecting a rotatable replica to a coupling assembly 16. An electric motor 90 can be linked to a drive spindle 91 by a drive belt 92 and pulley arrangement 94. The motor can be used to turn the hubs 26', 28' so that initial sensor readings can be taken to establish zero position and alignment calibration references. Then, the replica in FIG. 7 is disconnected from the system and the actual load and driven shafts set-up according to the desired set-up procedure. Once the equipment is up and running, the operator can monitor, on a real time basis if desired, the sensor outputs to observe how the alignment is changing, and whether the equipment shifts into the expected proper alignment. This information is readily available because the sensor outputs provide information as to axial compression, displacement and alignment, each independent of the other.

As a further enhancement of the set-up procedures available with use of the present invention, the use of optical sensors, such as a magneto-optic sensor design identified herein as well as others, allows for cold alignment determination using the apparatus and methods described herein. More specifically, optical sensors such as are used for proximity sensing, for example, can be used to produce output signals having a signal strength that is primarily a function of the distance between the teeth (42,44) and the sensors, rather than the speed of movement of the target teeth past the sensor. This is in comparison to a variable reluctance sensor, such as the monopole sensors described herein, which produce output signals whose signal strength (such as indicated by the output signal to noise ratio) is a function of the speed of movement of the teeth past the sensors.

In order to produce sharp well defined output signals from the monopole type sensors, the teeth should pass by the sensors at a fairly high rate of speed. This aspect of a variable reluctance sensor is satisfactory for normal rotational speeds of typical driven shafts, however, it is less than ideal for attempting to detect the teeth in order to characterize the shaft alignment during slow speed rotation such as would be desirable during set-up.

In accordance with this aspect of the invention then, an optical sensor is used such as described, for example, in the referenced patent 5,192,862 (Rudd). Such a sensor is a magneto-optic sensor, although the invention is not limited to the use of magneto-optics. In this exemplary embodiment, the sensor (as fully described in the patent) includes an associated magnetic field produced using a permanent magnet, for example. The sensor can be disposed as shown in FIG. 1 herein (as one or more of the sensors 50a–f) such that the teeth 42, 44 modulate or change the magnetic field as the teeth pass by the sensor. The sensor further includes a magneto-optic element that modulates a characteristic of light in relation to the magnetic field changes. The sensor thus produces an optical output that represents the proximity of the teeth with respect to the sensor. In the sensor described in the Rudd patent, the sensor modulates a diffraction pattern of light in response to the magnetic field. In other types of optical sensors that can be conveniently used with the instant invention, the sensor can be used to modulate the polarization state of light, or be based on an intensity variation of light reflected off the teeth 42, 44, to name just two other examples.

The optical sensor 50 output signal strength does not depend on the rate at which the teeth 42, 44 pass by the sensor. Those skilled in the art will readily understand that the speed of movement of the teeth past the sensor will affect the output signal frequencies, but even at very slow speeds the optical sensor output signals maintain a useful signal to noise ratio.

In accordance with the invention, a start-up or cold alignment procedure can be realized with the use of the apparatus of FIGS. 1–6, for example, without need for the set-up replica used in the embodiment described herein with respect to FIG. 7. In this way, set-up alignment can be determined by conveniently using the same apparatus as is used to monitor alignment during normal operation of the rotating equipment system.

An exemplary procedure can be performed as follows. The apparatus 1 is positioned in place and the initial alignment readings of the sensors can be taken if so desired. After the driver, drive shaft 10, driven shaft 12, couplings and other shafts are installed (all of these items being application specific and a matter of design choice), the rotating system can be operated at very slow speed (to maintain cold alignment conditions, for example) and the sensor 50 readings taken in the manner described hereinbefore. This produces the initial alignment data against which subsequent readings can be compared (electronically or by the operator if so desired) to monitor how the alignment changes as the rotating equipment spins and warms up.

The use of optical sensors as described herein permits detection of the teeth 42, 44 even at very slow speeds much less than the normal operating speeds of rotation. In order to obtain the most benefit from the various aspects of the invention, it is desirable to slowly rotate the system through several rotations using a plurality of the circumferentially disposed tooth pairs 42, 44 (as in FIG. 1, for example). This allows the use of time averaging the readings from the sensors 50 to improve accuracy of the data obtained. It is also useful to rotate the system at a constant rate of speed to simplify the signal processing requirements. However, as previously described herein, the uniformly spaced reference teeth 42 can be used to determine the rotation speed and therefore compensate the readings in the event a non-constant speed of rotation occurred. When the system is rotated at a slow but constant speed, the reference teeth 42 can also be used by the electronics to select the particular rotation that was most constant in speed to provide the best initial alignment data. In this regard, the electronics (such as in FIG. 6) can be provided with conventional processor devices and memory to save the signal 50 data for such processing as needed for a particular application.

The cold alignment procedure can be accomplished with less than a full rotation, depending on the accuracy required of the initial alignment data. An advantage to using a full or multiple slow speed rotations is that time averaging can be used to smooth out false or spurious readings from the sensors 50. However, when a specific application does not require such precise initial alignment data, less than one full rotation can be used. Such a partial rotation can be used so long as the teeth 42, 44 pass by the optical sensors being used to determine the system alignment at least once (those skilled in the art will understand that the number of sensors 50 used as well as their disposition about the rotating system 1 will be determined for each application depending on the particular type of alignment data to be collected as described herein).

Figure 8:
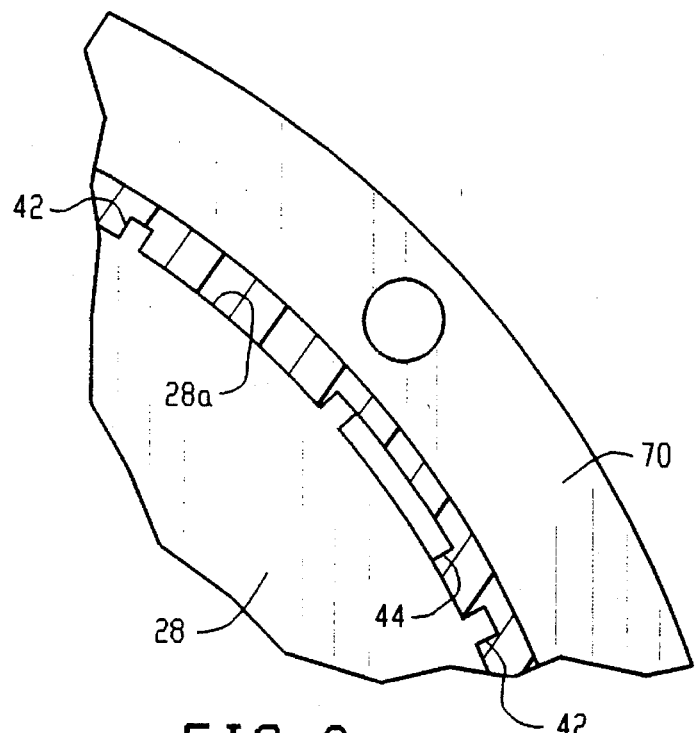
FIG. 8 is an end plan view of a tooth/hub arrangement for reduced windage.

With reference next to FIG. 8, we show a useful feature for use when the teeth 40 extend above the surface perimeter 28a of the hubs 26,28 (in FIG. 8 only one hub is shown for clarity.) In such a case, a cover 94 can be provided over the teeth, such a cover being for example, a layer of plastic, composite or other suitable material that provides a smooth outer surface 96 to reduce windage otherwise caused by the rotating teeth, as well as to protect the teeth if desired.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

We claim:

1. Apparatus for determining set-up alignment of an axially rotatable shaft, comprising: at least two detectable elements disposed on a perimeter rotatable by the shaft for rotation therewith and having a shaft axial position and axial alignment dependent relationship to each other; a plurality of sensors radially spaced from said perimeter for detecting the elements as they rotate past the sensors; the sensors producing one combined to indicate outputs that the shaft axial position and axial alignment as the shaft is rotated at slow rotation speeds relative to the shaft operating rotational speeds.

2. The apparatus of claim 1 wherein the sensor produces its output as a function of the position of the elements relative to the sensor independent of speed of rotation.

3. The apparatus of claim 2 wherein each sensor comprises a magneto-optic sensor that produces an output independent of the speed of movement of the elements past the sensor.

4. The apparatus of claim 1 wherein the shaft is rotated at a constant speed through at least one complete rotation.

5. The apparatus of claim 4 wherein the sensor detects rotation of the elements during operational rotation of the shaft so that the sensor output represents shaft alignment during such operation.

6. The apparatus of claim 1 further comprising a plurality of sensors disposed about the shaft axis of rotation such that each sensor detects the elements as the elements rotate.

7. The apparatus of claim 6 wherein the detectable elements comprise a plurality of pairs of elements, each pair comprising a reference element and an alignment dependent element, said pairs being equidistantly disposed about a radius from the shaft rotational axis.

8. The apparatus of claim 1 further comprising a control circuit that receives the sensors' outputs and combines said outputs to determine independently shaft axial displacement and angular alignment.

9. The apparatus of claim 8 wherein each sensor functions as a proximity detector to produce an output each time an element aligns therewith, each sensor producing its output as a function of the element position independent of the speed of movement past the sensor.

10. The apparatus of claim 9 wherein each sensor comprises a magneto-optic sensor.

11. The apparatus of claim 1 wherein each sensor detects said elements across a respective gap, each sensor producing an output characteristic substantially independent of said gap.

* * * * *